United States Patent [19]
Paturel et al.

[11] Patent Number: 6,062,725
[45] Date of Patent: May 16, 2000

[54] MACHINE OF THE WHISK-MIXER TYPE HAVING A RETRACTABLE PROTECTIVE SCREEN

[75] Inventors: Bruno Paturel; Bertrand Boitelle, both of Aubusson, France

[73] Assignee: Dito Sama, Aubusson, France

[21] Appl. No.: 09/195,615

[22] Filed: Nov. 19, 1998

[30] Foreign Application Priority Data

Nov. 20, 1997 [FR] France .................................. 97 14577

[51] Int. Cl.⁷ .................................................. B01F 15/00
[52] U.S. Cl. .......................... 366/347; 366/206; 366/207
[58] Field of Search .............................. 366/96–99, 197, 366/203, 206, 207, 347, 349, 601; 99/348, 645

[56] References Cited

U.S. PATENT DOCUMENTS

| | | |
|---|---|---|
| 2,014,734 | 9/1935 | Hoe . |
| 2,051,883 | 8/1936 | Morgan . |
| 2,193,356 | 3/1940 | Green . |
| 3,875,423 | 4/1975 | Kemper . |
| 4,900,160 | 2/1990 | Brooks et al. . |
| 4,968,149 | 11/1990 | Loiselet et al. . |
| 5,306,083 | 4/1994 | Caldwell et al. .......................... 366/347 |
| 5,472,276 | 12/1995 | Ratermann et al. ....................... 366/203 |
| 5,533,806 | 7/1996 | Veltrop et al. . |
| 5,660,469 | 8/1997 | Seguin .................................... 366/347 |

FOREIGN PATENT DOCUMENTS

| | | |
|---|---|---|
| 0 138 702 | 4/1985 | European Pat. Off. . |
| 0 650 008 A1 | 4/1995 | European Pat. Off. . |
| 2 728 485 | 6/1996 | France . |
| 2 740 064 | 4/1997 | France . |
| 521379 | 5/1940 | United Kingdom ................... 366/206 |
| 94/02233 | 2/1994 | WIPO . |

*Primary Examiner*—Charles E. Cooley
*Attorney, Agent, or Firm*—Sughrue, Mion, Zinn Macpeak & Seas, PLLC

[57] ABSTRACT

A machine of the whisk-mixer type having: a stand (2) equipped with a cradle (6) for holding a bowl (7) opposite a tool-support head (4); a protective screen (8) that can be moved between an active safety position in which it cooperates with the bowl to prevent access to the tool and a retracted position; and a detector (13) for detecting that the screen is present in the active position so as to allow the machine to operate, wherein the screen (8) comprises rods (10) which provide for removable attachment of the screen to an articulated lever mechanism (9) for articulating the screen to the stand of the machine, and wherein the cradle (6) and the bowl (7) prevent the screen from being removed at least while it is in the active position.

7 Claims, 2 Drawing Sheets

MACHINE OF THE WHISK-MIXER TYPE HAVING A RETRACTABLE PROTECTIVE SCREEN

BACKGROUND OF THE INVENTION

The present invention relates to a machine of the whisk-mixer type.

In general, such machines comprise a stand comprising means of holding a bowl opposite a tool-support head and a protective screen that is movable between an active safety position in which it cooperates with the bowl to prevent access to the tool, and a retracted position.

Furthermore, in these machines, there are also means of detecting that the screen is present in the active position so as to allow these machines to be started.

In certain machines of this type, the means of holding the bowl are also designed to move between a lowered retracted position in which the bowl can be withdrawn from the corresponding holding means or, on the other hand, fitted into them, and a raised working position.

In this case, means of detecting the position of the bowl-holding means in the active position are also provided, so that the machine is allowed to start only when these means are in the correct position.

Problems of the safe use of these machines have, however, been observed, because some users manage to manipulate the detection means described earlier in such a way as to allow the machine to operate when, for example, the screen is not in the active position.

To solve these problems, it has therefore been proposed in the state of the art, that the movements of the bowl-holding means and therefore of the bowl and those of the screen, be linked.

To this end, there are machines in which the means of maneuvering the screen and the means of holding the bowl are connected to each other and therefore allow the movement of the screen and of the bowl-holding means into their active position to be brought about simultaneously.

Thus, for example, such means may comprise a single actuating lever associated with the stand of the machine.

In other machines (see, for example, document FR-A-2, 728,485 in the name of the Applicant Company), provision is also made that it should be the screen which actuates the means of maneuvering the bowl-holding means, so that when a user moves the screen, the bowl-holding means move at the same time.

However, all these machines still have a certain number of drawbacks, particularly as far as the complexity of the operations of cleaning them and particularly of cleaning the screen, are concerned.

SUMMARY OF THE INVENTION

The object of the invention is therefore to solve these problems.

To this end, the subject of the invention is a machine of the whisk-mixer type, comprising a stand equipped with means for holding a bowl opposite a tool-support head, these means being movable between a lowered retracted position and a raised active position, with a protective screen that can be moved between an active safety position in which it cooperates with the bowl to prevent access to the tool and a retracted position, with means of associating the movements of the screen and of the means for holding the bowl and therefore of the bowl between their active and retracted positions, these means being connected to common actuating means formed by the protective screen, and with means of detecting that the screen is present in the active position so as to allow the machine to operate, characterized in that the screen comprises removable means of attachment to means of articulating this screen to the stand of the machine, and in that means are provided for preventing the screen from being removed at least while it is in the active position.

The invention will be better understood with the aid of the description which will follow, given merely by way of example and made with reference to the appended drawings, in which:

DESCRIPTION OF PREFERRED EMBODIMENTS

Figure 1:
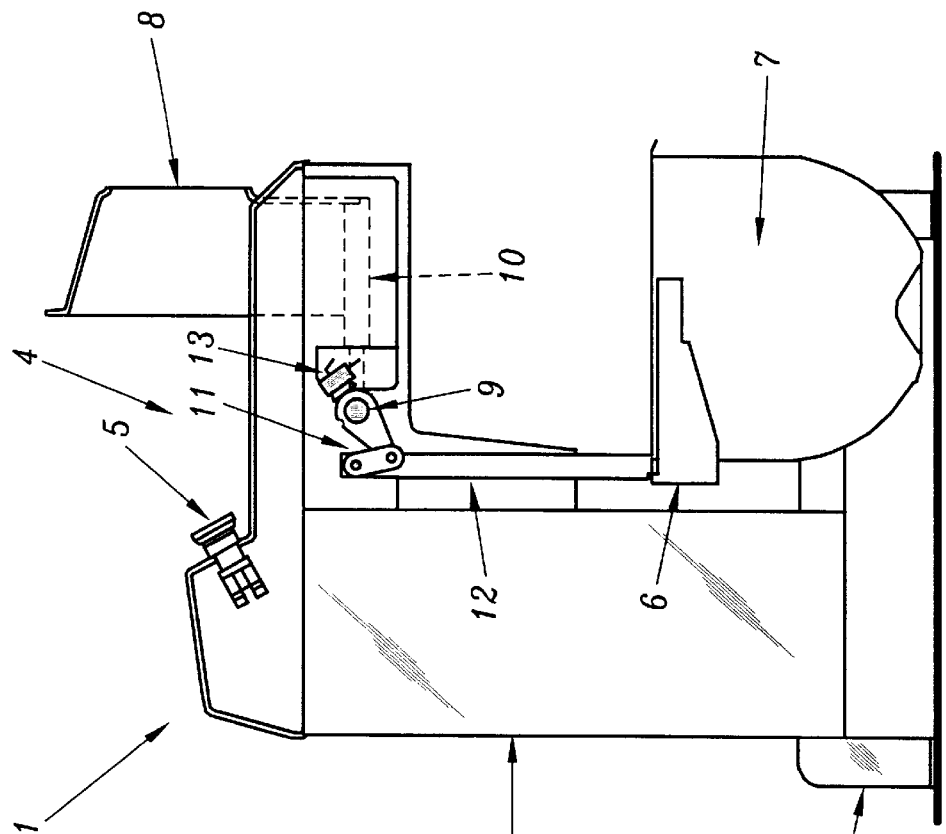
FIGS. 1 and 2 depict schematic side views illustrating the overall structure of one embodiment of a machine of the whisk-mixer type, in which views the screen is in the active position and in the retracted position, respectively.
Figure 2:
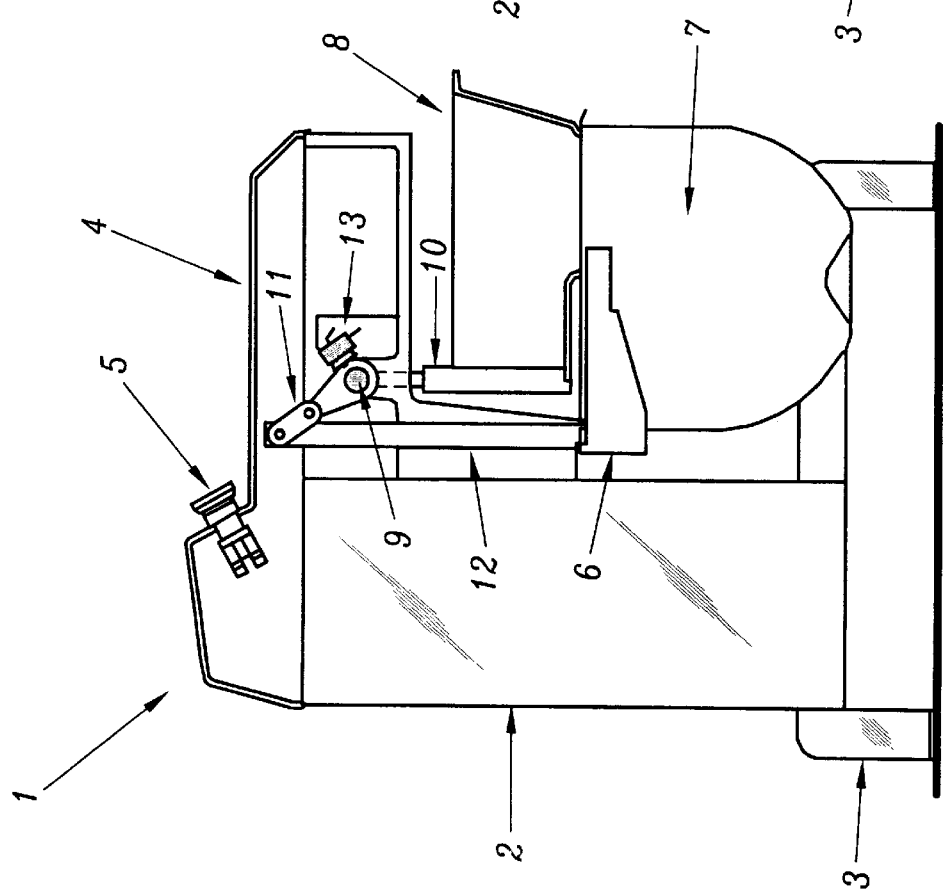

FIGS. 1 and 2 in fact show a machine of the whisk-mixer type, denoted by the overall reference 1.

Such a machine comprises a stand denoted by the overall reference 2, the lower part of which is equipped with base means denoted by the overall reference 3 and the upper part of which has a head denoted by the overall reference 4, on which means of controlling the operation of the machine, denoted by the overall reference 5 are provided, and which is intended to hold a tool (not depicted for reasons of clarity) in the conventional way.

Furthermore, this machine comprises means of holding a bowl opposite the tool-support head 4, these holding means being denoted by the overall reference 6 and the bowl being denoted by the overall reference 7.

In fact, the holding means 6 are, for example, in the form of a cradle which is mounted so that it can move, by vertical sliding for example, with respect to the rest of the stand of the machine, between a raised active working position like the one depicted in FIG. 1, and a lowered retracted position like the one depicted in FIG. 2, in which the bowl can, for example, be withdrawn from the corresponding holding means.

This stand is also equipped with a protective screen denoted by the overall reference 8 in these figures, this protective screen being movable, for example by pivoting on the head of the stand, as can be seen in these figures, between an active safety position, such as, for example the position depicted in FIG. 1, in which this screen cooperates with the bowl 7 to prevent access to the tool, and a retracted position such as, for example, the one depicted in FIG. 2.

In the embodiment described, the screen is mounted so that it can be moved between these active and retracted positions by pivoting with respect to the stand, by virtue of an articulation rod denoted by the overall reference 9, mounted so that it can pivot in and pass through the head of the stand.

In fact, in the example described, the protective screen 8 is connected to the ends of this articulation rod 9 which projects on each side of the head of the stand, by means of one or more arms of this screen, one of which is denoted, for example, by the overall reference 10 in these figures.

Incidentally, this articulation rod 9 is connected by one or more articulated-lever mechanisms, for example 11, to one or more pillars for moving the bowl-holding means 6, one of which pillars is denoted, for example, by the overall reference 12 in these figures.

It will therefore be understood that, in this case, when the user manipulates the protective screen 8 to move it between its active and retracted positions, the articulation rod 9 pivots in the head of the stand and drives the or each articulated-lever mechanism 11 and the or each pillar 12 so that the means 6 for holding the bowl 7 are moved at the same time.

Thus, for example, when the user lowers the protective screen 8 from it retracted position, depicted in FIG. 2, into its active position depicted in FIG. 1, the user at the same time causes the means 6 of holding the bowl 7 to rise from their lowered retracted position depicted in FIG. 2 into their raised active position depicted in FIG. 1.

Furthermore, this machine also comprises means of detecting that the screen is present in the active position, in order to allow the machine to be started.

These means comprise, for example, a detector of the end-of-travel switch type or the like, denoted by the overall reference 13 in this figure, designed to cooperate, for example, with one of the parts of the or of an articulated-lever mechanism, to detect that the screen is present in the active position and therefore allow the machine to operate.

As long as this screen is not in the active position, this detector 13, in the conventional way, prevents the machine from being started.

According to the invention, in this machine, the screen 8 comprises removable means of attachment to the means of articulating this screen to the stand of the machine, that is to say on the articulation rod 9 for example, and means of preventing this screen from being removed, at least while it is in the active position, are provided.

Figure 3:
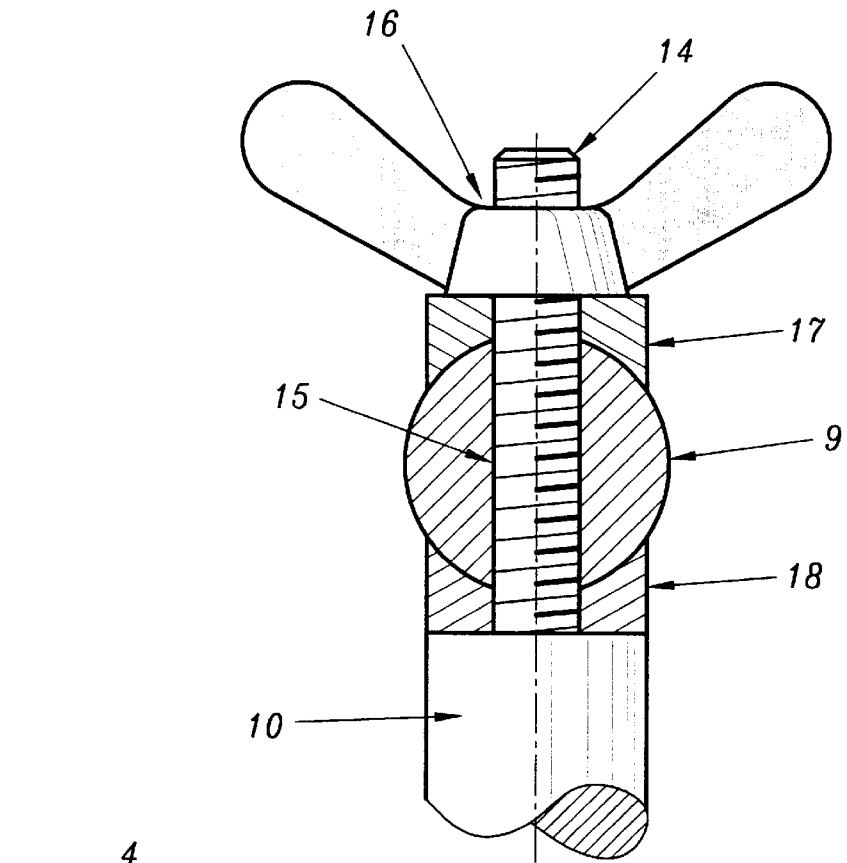
FIG. 3 depicts a detail view of one embodiment of removable means of attaching a screen that forms part of the construction of such a machine, to means of articulating this screen to the stand of this machine.

In effect, FIG. 3 depicts one embodiment of removable means of attaching the screen 8 to the articulation rod 9.

Thus, for example, each arm 10 for attaching this screen 8 to the articulation rod 9 may comprise, at its corresponding end, a rod-shaped portion, for example threaded, denoted by the overall reference 14 in this FIG. 3, designed to extend into a hole 15 passing through the corresponding end of the articulation rod 9 and to cooperate with immobilizing means consisting, for example, of means 16 of clamping this end of the arm 10 onto this end of the articulation rod 9, so as to attach these parts one on the other.

The clamping means 16 therefore, for example, comprise a wing nut which a user can operate.

In addition, in this example, clamping cups, denoted by the overall references 17 and 18, are inserted between the nut 16, the arm 10 and the articulation rod 9, around the portion 14 of the arm.

It will therefore be understood that removing the screen 8 from the articulation rod 9 is achieved simply by unscrewing the clamping means 16 and by sliding the or each arm 10 with respect to this articulation rod 9 so as to free the rod portion 14 of this or each arm from the corresponding hole 15 in this articulation rod 9.

However, and according to the embodiment depicted in FIGS. 1 and 2, when the screen 8 is in the active position, the axis of these removable means of attachment, that is to say for example the axis of the portion of rod 14 of the arm and of the hole 15 of the articulation rod, extends generally in the direction of the bowl 7 and of the corresponding holding means 6.

Now, in this active position, the lower part of the screen 8 is very close to, or even in contact with, the holding means 6 or with the bowl 7 to prevent access to the tool.

It will therefore be understood that in this case, one and/or other of these parts, that is to say the holding means 6 and/or the bowl 7 constitute stop means for the screen 8, preventing any removal thereof while preventing a user from freeing the attachment arms 10 of the screen from the corresponding rod 9 that articulates this screen to the stand.

This operation of removing the screen is therefore possible only when this screen is, for example, in the retracted position, as depicted in FIG. 2, in which the articulation rod 9 has pivoted, for example, through 90° with respect to the position depicted in FIG. 1 and in which it is therefore possible for a user to slide the screen attachment arms with respect to the means that articulate this screen to the stand of the machine so as, for example, to free the rod portions of these arms from the corresponding holes in the ends of the articulation rod.

It will therefore be understood that in this position, it is impossible to start the machine insofar as the detector 13 prevents this.

Furthermore, once the screen has been removed, it is impossible to use the machine because it is then impossible for a user to start the machine back up again insofar as he can no longer move the holding means 6 and the bowl 7 into their active position.

This is because it is impossible for a user to manipulate the articulation rod 9 by hand, that is to say without using any tools, with a view to raising the holding means 6 and the bowl 7 into the raised active position because of the use of the articulated-lever means 11 which constitute a mechanism that passes through a stiff point thus delimiting two stable positions of these means.

As was mentioned earlier, in this example, the stop means which also act as means for preventing the screen from being removed, consist of the bowl-holding means 6 and/or of the bowl 7 itself which, when the screen 8 is in the active position, prevents the arms 10 that attach this screen to the means 9 of articulating this screen to the stand of the machine from being freed from these articulation means.

Of course it goes without saying that other embodiments of these various means may be envisaged.

Thus, for example, an alternative form of these means has been depicted in FIGS. 4 and 5, in which identical reference numerals denote parts which are identical or similar to those already described with reference to the preceding figures.

These FIGS. 4 and 5 again show the stand 2 of the machine 1 and more particularly the tool-support head 4, the rod 9 that articulates the screen 8 to this head, and an arm 10 for attaching this screen to this articulation rod 9.

Each arm 10 still comprises, for example, removable means of attaching the screen 8 to the articulation rod 9 which, for example, have a structure similar to the structure of the means depicted in FIG. 3, that is to say a structure in which the corresponding end of each arm comprises, for example, a rod-shaped portion passing through a hole in the articulation rod and designed to cooperate with means of clamping this arm on this rod.

Figure 4:
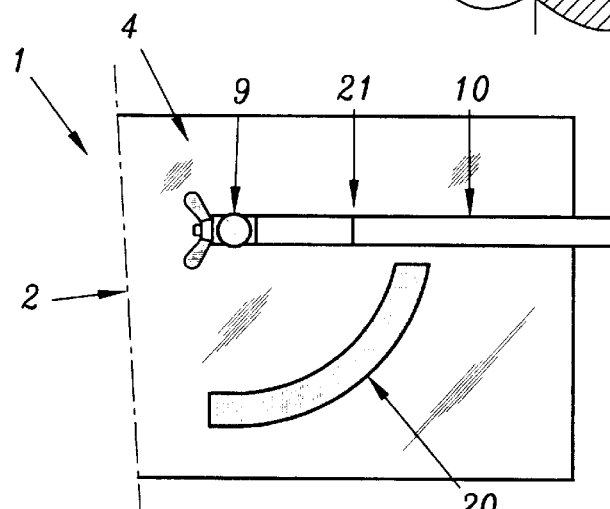
FIGS. 4 and 5 respectively depict side and plan views of part of such a machine comprising an alternative form of a removable screen that forms part of the construction of this machine.
Figure 5:
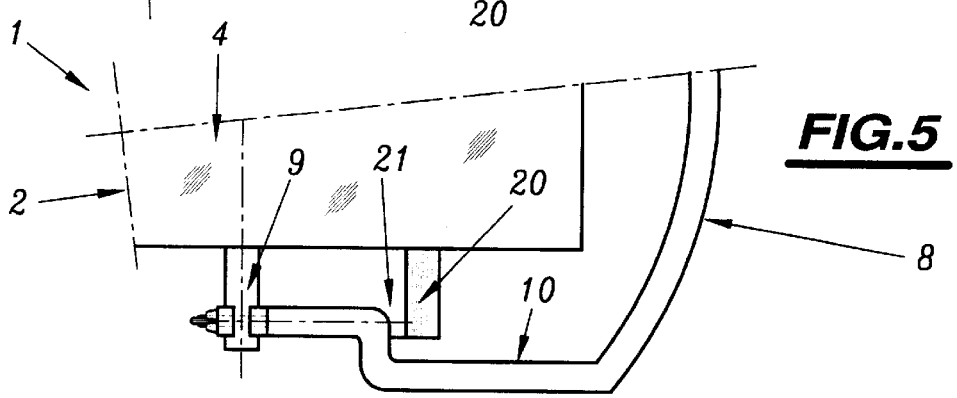

By contrast, the means for preventing the screen from being removed from this rod consist, in the embodiment depicted in FIGS. 4 and 5, of complementary parts in relief belonging to the or each arm of the screen and to the stand of the machine and more particularly, for example, the head of this stand and comprising, for example, a part 20 projecting from the tool-support head 4 of the machine, which is designed to extend opposite a shoulder 21 of the arm 10, as long as the screen 8 is not in the retracted position, as is depicted in FIG. 4.

Similar means may be provided symmetrically on the other side of the tool-support head of the stand of this machine.

So, it will be understood that these complementary means, that is to say the part 20 projecting from the tool-support head and the shoulder 21 of the arm 10 of this screen, prevent any removal of the screen while this screen is not in its retracted position, by preventing any disengagement of the corresponding end of the or each arm from the rod that articulates the screen to the stand of the machine except when this screen has reached its retracted position illustrated in FIG. 4.

These means therefore define a position in which the screen can be removed when this screen is in its retracted position.

For this purpose, the projecting part 20 may have a generally curved shape centered on the axis of pivoting of the articulation rod 9 in the head of the stand of the machine and finishing, for example, just before the retracted position of the screen, to allow this removal.

It goes without saying that the opposite may also be envisaged; that is to say that the arm may comprise a projecting part designed to engage in a groove in the stand of the machine, equipped with an opening for freeing the screen when it is in its retracted position.

It will be understood that in this case too, the operating safety of the machine is provided by the fact that the screen cannot be removed from the machine as long as this screen is not in the retracted position and that when this screen is removed, the user can no longer use the machine insofar as he can no longer manoeuvre the bowl-holding means to move them between their lowered retracted position and their raised active position.

Of course it goes without saying that yet other embodiments may be envisaged.

Thus, for example, the means for preventing the screen from being removed may also consist of means of preventing access to the means that immobilize the or each arm of this screen on the corresponding articulation rod, at least as long as the screen is in the active position.

These means then comprise, for example, a cover partially covering the corresponding end of this articulation rod.

What is claimed is:

1. A machine of the whisk-mixer type, comprising a stand (2) equipped with: holding means (6) for holding a bowl (7) opposite a tool-support head (4), said holding means being movable between a lowered retracted position and a raised active position; with a protective screen (8) that is movable between an active safety position, in which it cooperates with the bowl to prevent access to the tool, and a retracted position; with linkage means (9, 11, 12) for linking the movements of the screen (8) and the holding means (6), and therefore of the bowl (7), between the active and retracted positions, said linkage means being connected to common actuating means formed by the protective screen (8); and with means (13) for detecting that the screen is present in the active position so as to allow the machine to operate;

said machine being characterized in that the screen (8) comprises removable means (10, 14, 15, 16, 17, 18) for removably attaching the screen to articulation means (9) for articulating the screen to the stand of the machine, in that prevention means (6, 7; 20, 21) is provided for preventing the screen from being removed at least while the screen is in the active position, in that the removable means for attaching the screen (8) is removable through a sliding movement with respect to the articulation means (9), and in that the prevention means comprises stop means (6, 7; 20, 21) for preventing the sliding movement of the removable screen attachment means with respect to the articulation means (9).

2. The machine according to claim 1, characterized in that when the screen (8) is in the active position, an axis of the removable means extends in the general direction of the holding means (6) or the bowl (7), and in that the stop means is formed by at least one of the holding means (6) and the bowl (7).

3. The machine according to claim 1, characterized in that the stop means comprises complementary parts (20, 21) in relief belonging to the screen (8) and to the stand of the machine, so as to prevent the removable attachment means from being removed while the screen (8) is not in the retracted position.

4. The machine according to claim 1, characterized in that the stop means for preventing the screen (8) from being removed comprises means of preventing access to the removable means of attaching this screen (8) to the articulation means (9).

5. The machine according to claim 1, characterized in that the removable means for attaching the screen (8) comprises a rod-shaped part (14) of the end of at least one arm (10) used for attaching the screen (8) to the articulation means (9), this rod-shaped part being designed to fit into a hole (15) of said articulation means, and in that this rod-shaped part (14) is designed to cooperate with means (16) for immobilizing this arm on said articulation means (9).

6. The machine according to claim 5, characterized in that the immobilizing means comprise means (16) for clamping the arm on the articulation means.

7. The machine according to claim 1, characterized in that the linkage means comprises at least one mechanism that passes through a stiff point (11) connected at one of its ends to the articulation means (9) and at the other of its ends to at least one pillar (12) for maneuvering the holding means (6).

* * * * *